United States Patent [19]

Barlow

[11] 4,395,131
[45] Jul. 26, 1983

[54] APPARATUS FOR AGITATING, CONVEYING AND WEIGHING PARTICULATE MATERIAL

[75] Inventor: Robert C. Barlow, Seaford, Del.

[73] Assignee: O. A. Newton & Son Company, Bridgeville, Del.

[21] Appl. No.: 192,376

[22] Filed: Sep. 30, 1980

[51] Int. Cl.$^3$ ............................................. B01F 15/02
[52] U.S. Cl. .................................... 366/141; 366/186; 366/193
[58] Field of Search .................. 366/18, 50, 141, 186, 366/192, 193

[56] References Cited

U.S. PATENT DOCUMENTS

| | | |
|---|---|---|
| 292,550 | 1/1884 | Fairly . |
| 509,987 | 12/1893 | Wilcox ............................ 366/186 X |
| 875,228 | 12/1907 | Witham . |
| 1,109,144 | 9/1914 | Perkins . |
| 1,813,183 | 7/1931 | Mathewson . |
| 2,151,253 | 3/1939 | Whitney . |
| 2,303,584 | 12/1942 | Schweickart . |
| 2,608,395 | 8/1952 | August . |
| 2,633,272 | 3/1953 | Moore et al. . |
| 2,650,002 | 8/1953 | Farley . |
| 2,694,557 | 11/1954 | Reese et al. ......................... 366/186 |
| 2,721,007 | 10/1955 | Matthews . |
| 2,991,870 | 7/1961 | Griffith et al. .................. 366/186 X |
| 3,310,205 | 3/1967 | Meyer . |
| 3,414,168 | 12/1968 | Eckhardt . |
| 3,494,511 | 2/1970 | Daignas . |
| 3,548,903 | 12/1970 | Holly .............................. 366/186 X |
| 3,570,569 | 3/1971 | Hartley et al. .................. 366/186 X |
| 3,779,033 | 12/1973 | Swanson . |
| 3,782,642 | 1/1974 | Trafford . |
| 3,889,850 | 6/1975 | Whitt . |
| 3,948,421 | 4/1976 | Marchadour . |

FOREIGN PATENT DOCUMENTS 832774   4/1960   United Kingdom ................. 366/18

OTHER PUBLICATIONS

Screw Conveyor Corporation, Screw Conveyor Catalog and Engineering Manual, Copyright 1975, p. 32.

Primary Examiner—Philip R. Coe
Attorney, Agent, or Firm—Irvin A. Lavine

[57] ABSTRACT

The present invention relates to an apparatus for agitating, conveying and weighing particulate material. An agitator is provided including a generally cylindrical housing having end walls with bearings in them. An agitator is provided in the housing, including a pair of end members having openings therein; stub shafts are supported by shaft hangers and extend through the end wall bearings and the end members, for ready removal, axially, permitting removal of the agitator in a radial direction through an opening in the housing. A screw conveyor beneath the agitator has a housing removably connected to the agitator housing. A single direct current drive motor is provided, connected by sprockets and chains to the agitator shaft and to the shaft of the screw conveyor. The screw conveyor has a delivery conduit of short extent, connected to a transverse gate valve, below which is a weighing hopper, comprising a receiver and a scale, and the screw conveyor is provided with comminuting elements to insure uniform specific gravity of material passing from it to the receiver of the weighing hopper, to provide accuracy of the weighed amount of material.

5 Claims, 7 Drawing Figures

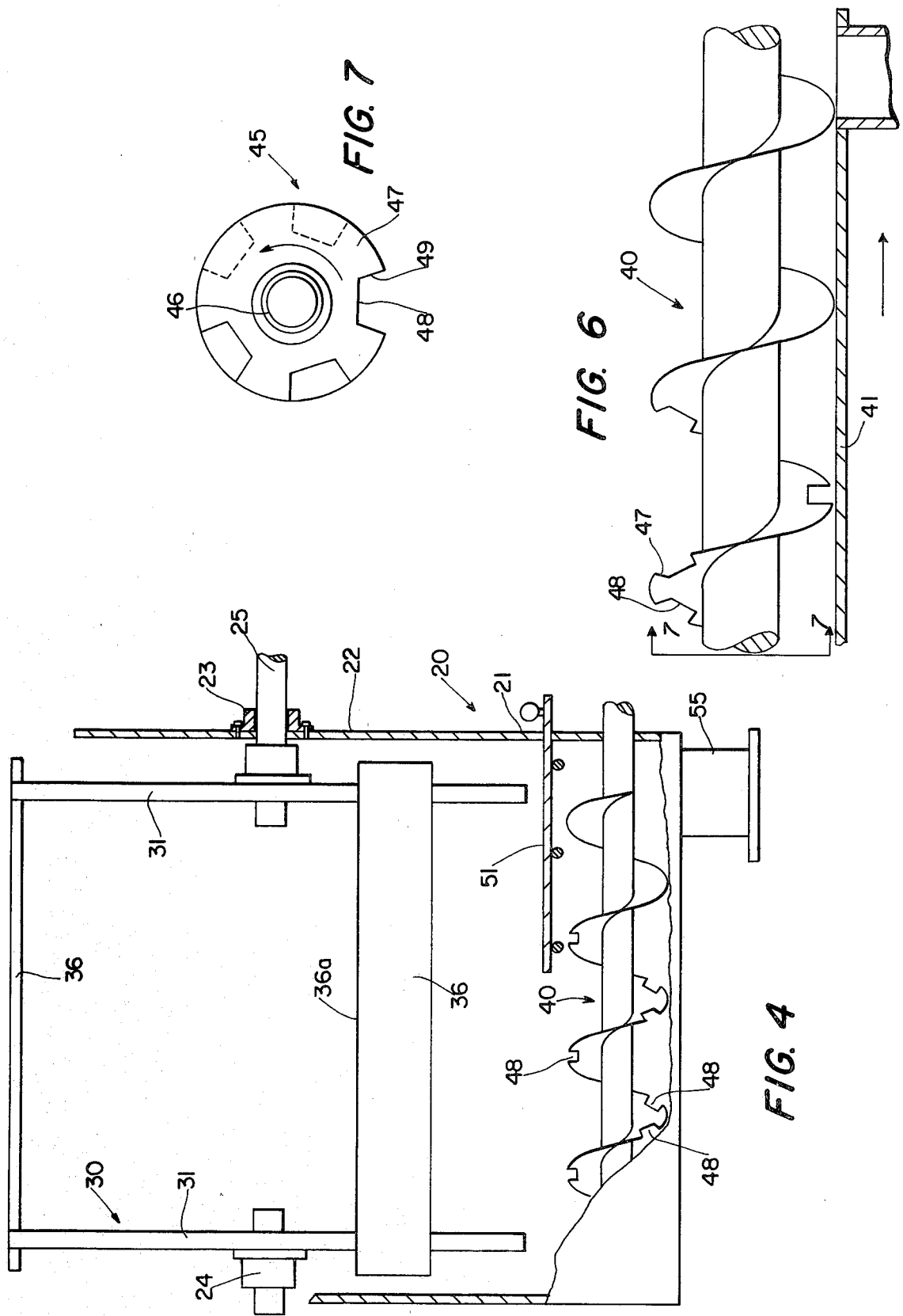

APPARATUS FOR AGITATING, CONVEYING AND WEIGHING PARTICULATE MATERIAL

CROSS-REFERENCE TO RELATED APPLICATION

This application is related to application Ser. No. 180,923, filed Aug. 25, 1980, entitled Particulate Material Dispensing and Weighing System and Method, by Robert C. Barlow, now U.S. Pat. No. 4,345,858, issued Aug. 24, 1982.

BACKGROUND TO THE INVENTION

The present invention relates to apparatus for agitating, conveying and weighing particulate material, and comprises an agitator, a scale in combination with a screw conveyor, and a drive for the agitator and screw conveyor.

Various agitators have been provided in the prior art, including agitators mounted in a generally cylindrical housing, with a pair of end wheels or end disks, and agitator bars extending between them, parallel to the axis of rotation. Typically, a shaft extended through the end wheels or end disks, being supported in bearings on the end walls of the housing. An example of such an agitator, although from a remote field, is Matthews U.S. Pat. No. 2,721,007. In order to remove the agitator for replacement, maintenance and the like, it was necessary to remove the entire shaft, and in many installations, due to adjacent structures, there was required a very cumbersome and time consuming procedure.

When weighing systems have been provided with an agitator and a screw conveyor for agitating and delivering particulate material to a weighing hopper, including a receiver and scale, the agitator and the screw conveyor were driven either by separate motors, or by an Alternating Current Motor. In such apparatus, there is a requirement that the amount of material being delivered per unit of time to the weighing hopper be adjusted, in accordance with the characteristics of the material, such as the density of it. Such weighing systems often form part of a multiple weighing system in which a plurality of particulate materials are stored and a batch is made up of a predetermined desired amount of each of the particulate materials. With such multiple component delivery systems, there is an allowable time determined for the delivery of each component to the weighing hopper, and it is desirable, as a consequence, that the screw conveyor be operated as slowly as possible so as to accurately deliver the required weight of material in the predetermined time for the delivery of that particular material. This required, as noted, adjustments of the delivery rate of the screw conveyor. In the prior art, thus adjustment was accomplished through utilization of the noted alternating current motor, and use of alternately usable sprockets, forming part of a chain drive. This provided less than optimum results, and particularly less than optimum accuracy in the delivery of material, as well as not accomplishing the intended results in the allotted time.

Among the patents in the prior art disclosing apparatus including an agitator and a conveyor are MOORE et al. U.S. Pat. No. 2,633,272, FARLEY U.S. Pat. No. 2,650,002, and MEYER U.S. Pat. No. 3,310,205.

In the known particulate material handling systems in which particulate material is stored, delivered to a conveyor, and from the conveyor to a weighing hopper, it is known to provide a delivery conduit which extends downwardly to the receiver of the weighing hopper, and to provide a valve in the delivery conduit. As the particulate material passes through the delivery conduit and reaches the receiver, the total weight of the particulate material in the receiver increases, and the weight of the material in the receiver is constantly weighed. When the scale indicates that the desired total weight is being approached, the valve in the delivery conduit is closed; this may be done either manually or automatically. In either case, the delivery conduit valve is closed prior to the weight in the receiver of the weighing hopper reaching the final desired total weight, since it is known that there is particulate material in flight in the delivery conduit. Another factor which must be considered is the time allotted for the delivery of the desired amount of particulate material, with consequent increase or decrease in the speed of operation of the screw conveyor, and consequently there is a different amount of material in flight, depending upon the speed of operation of the screw conveyor. The greater the speed of the screw conveyor, set to deliver the required amount of material in a relatively short time, causes an increase in the amount of material in flight during any given time span. Consequently, the point at which the cut-off valve is caused to be closed depends upon the rate of delivery of the material, so that for a higher rate of delivery of material, deriving from a higher speed of the screw conveyor, the noted valve is caused to be closed when the receiver of the weighing hopper has a relative lesser amount of particulate material in it, than would be the case where the speed of the screw auger is relatively slower, and there is, as a consequence, less material in flight during the same time span.

Heretofore, the desired accuracy of the weighed amount of particulate material has not always been achievable, due in part to an assumption which has not proven to be valid. That assumption is that the particulate material in flight is of uniform consistency, and is therefore of uniform specific weight. That is, it is assumed that every increment of particulate material reaching the receiver has the same volume and weight as every other increment. In fact, it is now been found that this assumption is not always valid, leading to errors in the amount of particulate material weighed.

Screw conveyors have long been used for conveying a wide variety of materials. Some materials which are now being conveyed in screw conveyors are particulate, being finely divided, and some of the material tends to remain in the screw conveyor. Thus, when the particular storing, delivering and weighing system is utilized for a different particulate material, contamination may occur. The prior art screw conveyors, particularly when associated with agitators, have not been constructed so as to permit ready cleaning thereof.

SUMMARY OF THE INVENTION

The present invention provides an agitator hopper having an agitator housing and a rotating agitator therein. The rotating agitator is supported by a pair of stub shafts, which extend through the end walls of the agitator housing, and engage end members of the rotating agitator; these stub shafts may be withdrawn axially, and the agitator housing has an opening through which the agitator itself may be withdrawn radially.

A combination screw conveyor and weighing hopper is provided, in which uniformity of increments of particulate material delivered to the weighing hopper by the screw conveyor is insured, to thereby insure accuracy of the weighed amount of particulate material. This is accomplished by providing comminuting or cutting means in the screw conveyor, particularly by providing cutting edges on notches in the flight of the screw conveyor, so as to cut into and therefore comminute any coagulated or agglomerted masses or lumps of the particulate material prior to discharge thereof from the screw conveyor. In this way, there is achieved uniformity in the specific gravity of all of the particulate material delivered to the weighing hopper, and, consequently, uniformity of the increments of particulate material which are in flight when the valve in the delivery conduit is closed. The flight or flights adjacent the delivery conduit are without notches to prevent undesired discharge of freely flowing material at a faster rate than commanded by the rate of rotation of the conveyor screw.

In order to provide accuracy of the weight of material in the weighing hopper, considering the time constraints on the delivery of a particular weight of material, there is provided an agitator having a rotating agitator structure, a screw conveyor having a rotating conveyor screw, and a constant torque variable speed drive apparatus for the rotating elements, comprising a single Direct Current Motor. The Direct Current Motor is drivingly connected to the rotating elements of the agitator and the screw conveyor by a suitable mechanical coupling, specifically the provision of a pair of sprockets on the output shaft of the direct current electric motor, or a gearing system driven by it, and a sprocket on the shaft of each of the rotating elements, with chains extending between the driving and driven sprockets. A tension adjuster may be provided.

In order to permit ready cleaning of the screw conveyor, the housing of the screw conveyor is constructed, in part, as a U-shaped trough having a pair of opposed upstanding side walls; these side walls overlap side walls depending from the bottom of the agitator hopper, and are connected to them by releasable fasteners. Also, an adjustable plate is provided in the housing over the delivery conduit.

Among the objects of the present invention, therefore, are the provision of an agitator hopper constructed so that the agitator thereof may be readily removed; the provision of a particulate material delivery and weighing apparatus in which greater accuracy is achieved in the amount of material weighed, considering time constraints on the weighing of a batch of material, by insuring uniformity of the specific gravity of the material being delivered to the weighing hopper; the provision of a delivery system including an agitator hopper and a screw conveyor driven at variable speeds, in unison, and at speeds which vary uniformly; and a further object is to provided a construction of a screw conveyor which may be readily cleaned.

Other objects and many of the attendant advantages of the present invention subject matter will be readily understood from the following specification, claims and drawings.

BRIEF DESCRIPTION OF THE DRAWING

FIG. 4 is a cross-sectional view, with parts broken away, of the agitator hopper, taken on the line 4—4 of FIG. 3.

FIG. 6 is an elevational view, with parts broken away, showing the screw conveyor including the conveyor screw and part of the housing thereof.

FIG. 7 is an end view of the conveyor screw show in FIG. 6, taken on the line 7—7 of FIG. 6.

DESCRIPTION OF THE PREFERRED EMBODIMENT

Figure 1:
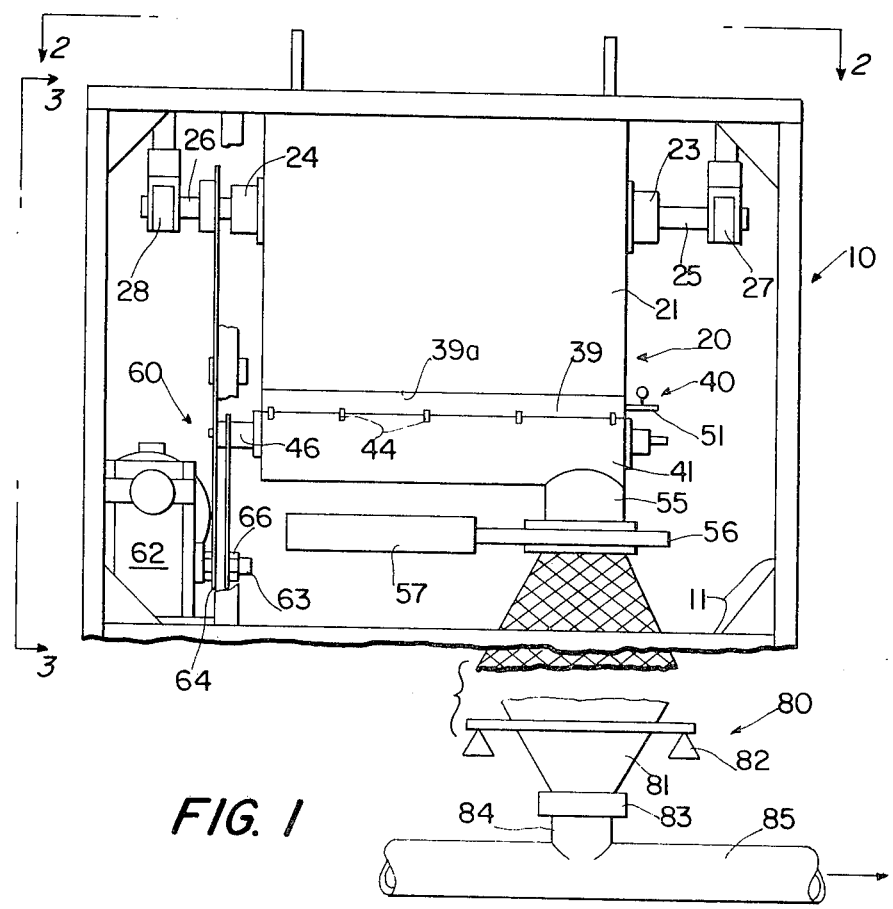
FIG. 1 is an elevational view, partially schematic and partially broken away, of an apparatus in accordance with the present invention.

Referring now to the drawings, wherein like or corresponding reference numerals are used to designate like or corresponding parts throughout the several views, there is shown in FIG. 1 an apparatus 10 for agitating, conveying and weighing particulate material. Apparatus 10 is shown as a single unit; in practice, a plurality of such apparatus may be provided, for the handling of a plurality of different materials, each of them being substantially identical. The apparatus 10 includes a structural support frame 11 of conventional construction, and further includes an agitator hopper 20, a screw conveyor 40, a drive system 60, and a weighing hopper 80.

Figure 3:
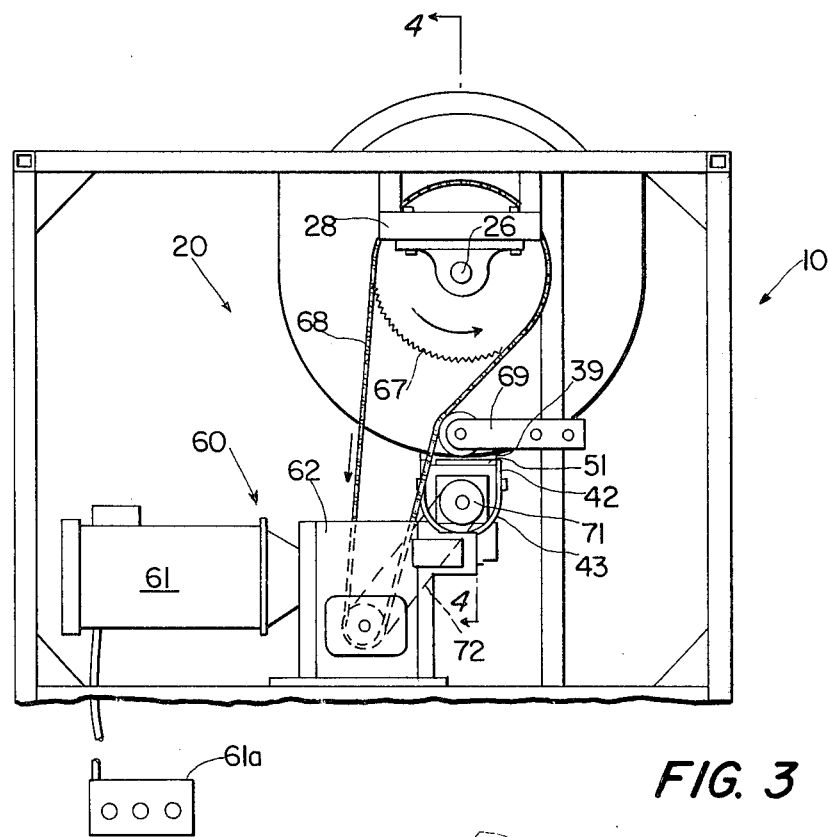
FIG. 3 is a view taken on the 3—3 of FIG. 1, with parts removed.

Agitator hopper 20 has a housing 21 which is longitudinally extending, and as is shown in FIG. 3, is generally cylindrical, having an opening at the top; a storage hopper, or the like, not shown, may be provided for delivering material to the agitator hopper 20, or particulate material may be delivered into the agitator hopper 20 through the upper opening therein from such means as delivery conduits or bags of material. As shown in FIG. 4, the housing 21 is provided with end walls 22 which extend transversely of the axis of agitator hopper 20. The end walls 22 are provided with openings, to which bearings 23, 24 are mounted. These bearings have passing through them stub shafts 25 and 26, respectively. The structural support frame 11 supports shaft hangers 27 and 28 which support, respectively, the shafts 25 and 26. The shaft hangers 27 and 28 are spaced from the bearings 23 and 24, being outwardly thereof and in alignment therewith.

Figure 5:
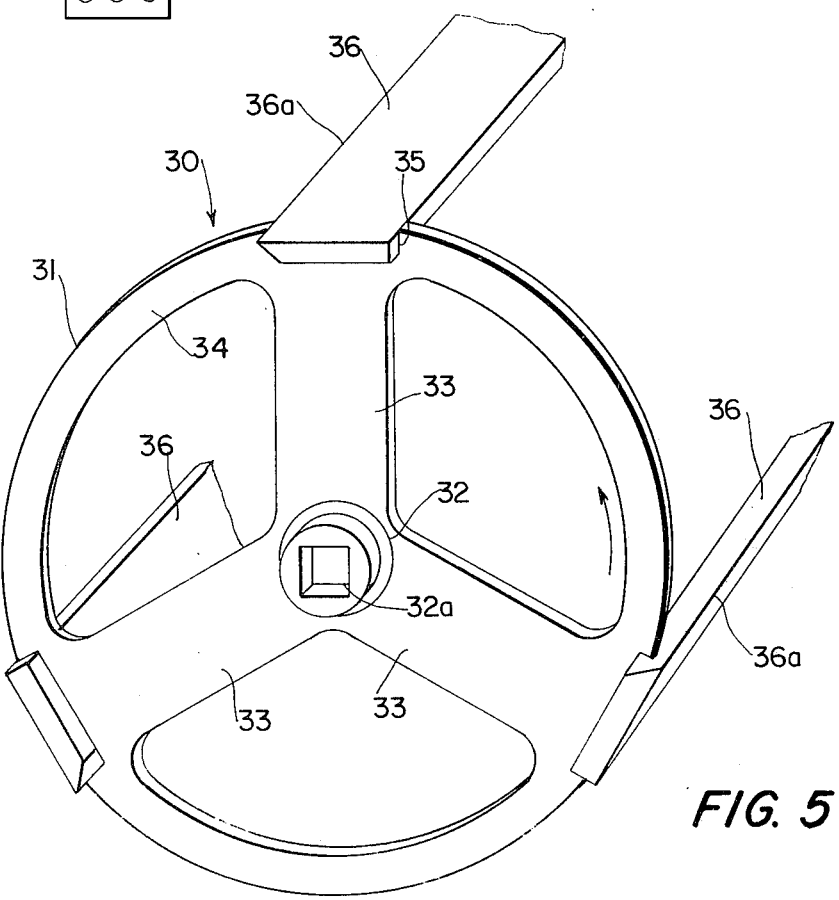
FIG. 5 is a perspective view, partially broken away, of a rotatable agitator of the agitator hopper shown in FIG. 4.

Referring now to FIGS. 4 and 5, within the housing 21 of agitator hopper 20 there is provided a rotatable agitator 30 which includes a pair of end members or supports 31, each comprising a central hub 32, a plurality of radial arms 33, and an annular rim 34 supported by the radial arms 33 at their outer ends. The annular rim 34 has a plurality of recesses 35, and an agitator bar 36 is secured in each recess 35, there being three such bars 36, as is clearly shown in FIG. 5. Each of the bars 36 is generally flat, extends generally parallel to the axis of the agitator 30, and is provided with a knife edge 36a. As shown in FIG. 5, the hub 32 is provided with the central opening 32a, shown as being a square opening. The openings 32a each receives an end of a stub shaft, which is made of complementary shape, and the inner ends of the stub shafts 25 and 26 as shown in FIG. 4 are each positioned a short distance inwardly of the end member or end support 31 which has the central opening 32a in which that stub shaft is engaged.

The stub shafts may be releasably secured against axial movement by any conventional means, so that, when desired, the stub shafts 25 and 26 may each be slid outwardly, so as to be disengaged from the agitator 30, following which agitator 30 may be removed in a radial direction, upwardly through the upper opening 37 (FIG. 2) in the agitator housing 21. Opposite the upper opening of the agitator housing 21 (see FIG. 4) there is a lower longitudinal opening 38 through which particulate material is delivered to the inlet opening of the screw conveyor 40.

Figure 2:
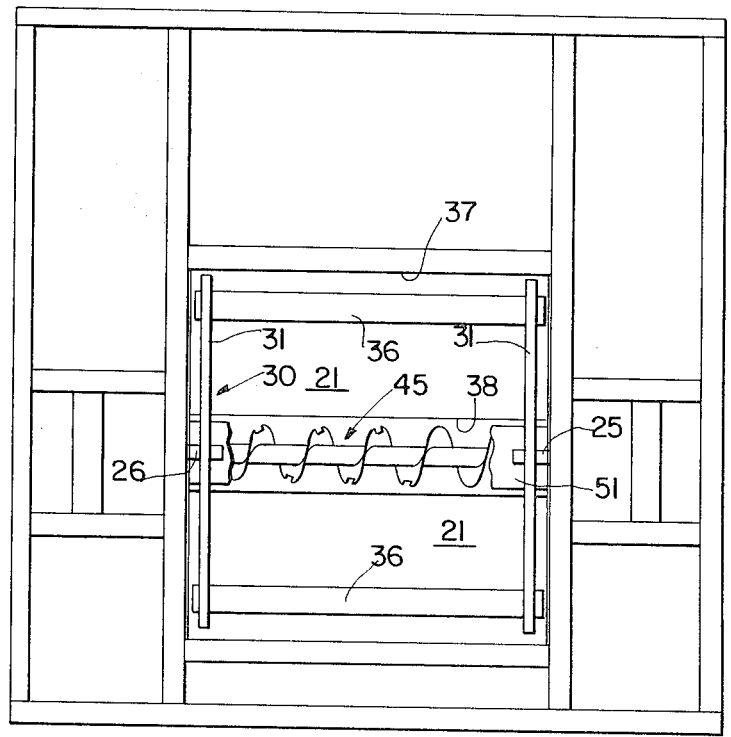
FIG. 2 is a view taken on the line 2—2 of FIG. 1.

Referring now to FIG. 2, there may be seen through the upper opening 37 of the agitator housing 21, the rotating agitator 30, including the end supports or end members 31 and two of the bars 36. There may also be seen the ends of the stub shafts 25 and 26, and the lower opening 38 of the agitator hopper 20, this lower opening 38 being provided between a pair of opposed, longitudinally extending substantially parallel side walls 39 (See FIG. 3) which depend in spaced apart relationship from the arcuate portions of the housing 21. The walls 39 will be seen in FIGS. 1 and 3 to have, at the uppermost portion of the walls 39 and the lower most portion of the arcuate walls of housing 21, a line of juncture, designated 39a.

The screw conveyor 40 includes a housing 41 having a pair of opposed, substantially parallel side walls 42, as shown in FIG. 3, which merge with a U-shaped bottom trough 43. The side walls 42 of the housing 41 define between them inlet opening 42a, are in overlapping relationship with the side walls 39 of the housing of the agitator hopper 20, and are connected thereto by releasable fasteners 44. A very short delivery conduit 55 extends downwardly from the trough 43, the trough 43 having an opening therein so that the interior thereof is in communication with the delivery conduit 55. A plate 51 is supported in longitudinally extending inlet opening 42a over delivery conduit 55 to prevent radial movement of material from hopper 20 to conduit 55; plate 51 is longitudinally adjustable.

Forming a part of the screw conveyor 40 is a conveyor screw 45 having a shaft 46 which may be either solid or hollow, there being provided on the shaft 46 a flight 47 having a series of notches 48, the notches 48 being provided with comminuting or cutting edges 49. The positioning of the notches 48 in the flight 47 may be readily seen in FIG. 7. Preferably, the portion of flight 47 adjacent the right hand or discharge end of the screw conveyor 40 is without notches, which are therefore remote from the delivery conduit 55; this is to prevent freely flowing particulate material from running out of the screw conveyor 40 when it is stopped, or from running out faster than commanded by the speed of rotation of the conveyor screw 45.

The shaft 46 of conveyor screw 45 will be seen in FIG. 1 to extend out of the housing 41.

A drive system 60 is provided for the shafts 26 and 46 of the agitator hopper 20 and screw conveyor 40 respectively, and includes, as shown in FIG. 3, a direct current electric motor 61, having the characteristics of variable speed and constant torque. The electric motor 61 has its output shaft connected to a transmission unit 62 having an output shaft 63 on which are a first sprocket 64 and a second sprocket 66. The shaft 26 of the agitator hopper 20 has a sprocket 67 thereon (See FIG. 3) and a chain 68 engages the sprockets 64 and 67. A tension adjuster 69 is also provided for the chain 68. The sprocket 67 may be attached to the shaft 26 by a releasable set screw or other similar device, so as to permit shaft 26 to move axially relative to sprocket 67. The shaft 46 of the screw conveyor 40 has a sprocket 71 thereon, and a chain 72 engages the sprocket 71 and the sprocket 66.

The speed of the direct current electric motor may be varied readily by speed controller 61a, in known manner, but as will be understood, the torque delivered will remain constant, irrespective of the speed. As a result, the speed of the screw conveyor 40 may be selected for as slow a speed as possible to deliver the required amount of material within a specific allotted time. The screw conveyor will therefore be enabled to run as slow as possible, taking into consideration the weight of material which is to be delivered, and the time permitted or allotted for the delivery thereof. In addition, at the point in the delivering and weighing of material where only a small amount of material remains to be delivered, it is possible to slow the speed of the screw conveyor to a great degree, to provide a comparatively small weight of material delivered per unit of time, with the result that there will be a comparatively smaller amount of material in flight, thereby increasing the accuracy of the system.

Referring again to FIG. 1, the weighing hopper generally designated 80 includes a receiver 81 for holding a supply of particulate material, the receive 81 being supported by a weighing apparatus or scale, schematically illustrated and designated 82. Material is delivered to the receiver 81, for being weighed, through the delivery conduit 55. The delivery conduit 55 is very short, and has at its end a gate valve 56, of known construction, gate valve 56 preferably being moved by actuator 57, which may be either a solenoid, a pneumatic cylinder, or other actuator. Below the receiver 81 is a discharge valve 83, which permits, when open, discharge of particulate material through a delivery conduit 84 into a pneumatic delivery line 85. Thus, the weighed quantity of particulate material is delivered from the screw conveyor 40 to the receiver 81, the gate valve 56 is closed, and then the valve 83 is opened in order to permit removal of the particulate material from receiver 81 and to effect its delivery through the delivery line 85.

There has been provided herein an apparatus for agitating, conveying and weighing particulate material. The apparatus includes an agitator having a lower opening which discharges paticulate material into the upper opening of a screw conveyor. The screw conveyor has a discharge outlet connected with a delivery conduit, which delivers particulate material through a valve into a receiver of a weighing hopper. An adjustable plate in the inlet of the screw conveyor overlies the outlet thereof. The agitator hopper includes a rotatable agitator and a pair of stub shafts, which may be withdrawn axially, to permit the agitator to be withdrawn radially from the housing. The material delivered from the screw conveyor is of uniform specific gravity due to cutting elements on the screw conveyor, so that any increment delivered is of the same specific gravity as any other increment, whereby when the gate valve between the screw conveyor and the receiver of the weighing hopper is closed, the in flight material will be of uniform consistency, and therefore there will be achieved greater accuracy of the volume of the material weighed. Further, both the agitator and conveyor screw of the agitator hopper and screw conveyor respectively, are driven by a single direct current variable speed, constant torque motor, so as to permit selection of the rotational speed of the agitator and of the conveyor screw. Further, control of the speed of the screw conveyor, and therefore of the weight of the material delivered, per unit of time, may be varied and selected. The screw conveyor has comminuting means on the conveyor screw remote from the discharge end, and the housing thereof is readily detached from the supporting walls to which it is connected, these being walls of the housing of the agitator hopper, such construction thereby permitting ready removal of the housing of the screw conveyor for cleaning of it and of the conveyor screw.

It will be obvious to those skilled in the art that various changes may be made without departing from the spirit of the invention, and therefore the invention is not limited to what is shown in the drawings and described in the specification but only as indicated in the appended claims.

I claim:

1. In combination,
   (a) an agitator hopper comprising
      (i) a housing having a feed opening in the upper part thereof,
      (ii) a rotating agitator in said housing,
      (iii) a shaft drivingly connected to said agitator, and
      (iv) a delivery opening in a lower part of said housing,
   (b) a screw conveyor below said agitator hopper comprising
      (i) a housing having an inlet in the upper part thereof in communication with the outlet of said agitator hopper,
      (ii) a conveyor screw in said housing having a shaft, and
      (iii) a delivery conduit connected with said screw conveyor housing for receiving material therefrom and having a cut-off valve therein,
   (c) a weighing hopper including
      (i) an inlet connected to the delivery conduit,
      (ii) material receiving and weighing means, and
      (iii) discharge means for discharging weighed material therefrom, and
   (d) drive means for said shafts of said agitator hopper and screw conveyor including means for selectively varying the speed thereof,
   whereby the rate of delivery of material of said weighing hopper may be selected to utilize the entire filling period available at the slowest delivery speed and thereby to obtain the least amount of material in flight subsequent to the closure of said valve.

2. The combination of claim 1, said drive means for said shafts of said agitator hopper and screw conveyor comprising a direct current electric motor having an output shaft, means for drivingly connecting the output shaft to said shafts of said agitator hopper and screw conveyor, and speed control means connected to said direct current electric motor for selectively varying the speed thereof.

3. The combination of claim 2, said means for drivingly connecting said shafts comprising sprockets on said shafts and chains engaging said sprockets.

4. The combination of claim 2, said means for drivingly connecting said shafts comprising first and second sprockets on the motor output shafts, a sprocket on each of said agitator and conveyor screw shafts, a first chain engaging said first output shaft sprocket and said agitator sprocket and a second chain engaging said second output shaft sprocket and said conveyor screw shaft sprocket.

5. The combination of claim 4, and means engaging at least one said chain for adjusting the tension thereof.

* * * * *